(12) United States Patent
Herth (10) Patent No.: US 7,538,270 B2
(45) Date of Patent: May 26, 2009

(54) COMMERCIAL PLASTIC ELECTRICAL BOXES WITH METAL SECTIONS

(76) Inventor: Greg Herth, 10 Tower Mews, P.O. Box 507, Oakdale, NY (US) 11769-2420

( * ) Notice: Subject to any disclaimer, the term of this patent is extended or adjusted under 35 U.S.C. 154(b) by 33 days.

(21) Appl. No.: 11/897,854

(22) Filed: Aug. 31, 2007

(65) Prior Publication Data

US 2009/0056969 A1     Mar. 5, 2009

(51) Int. Cl.
*H02G 3/08* (2006.01)
(52) U.S. Cl. .................. 174/50; 174/53; 174/58; 174/64; 248/906; 439/535; 361/600
(58) Field of Classification Search .................. 174/50, 174/53, 58, 64; 220/4.02, 3.2, 3.3; 248/906; 439/535; 361/600
See application file for complete search history.

(56) References Cited

U.S. PATENT DOCUMENTS

| 4,082,915 | A | * | 4/1978 | Silver | 174/51 |
| 5,726,385 | A | * | 3/1998 | Lowery et al. | 174/50 |
| 7,022,912 | B1 | * | 4/2006 | Kilburn | 174/50 |

* cited by examiner

*Primary Examiner*—Dhiru R Patel
(74) *Attorney, Agent, or Firm*—Alfred M. Walker (57) ABSTRACT

Molded plastic commercial electrical boxes are provided with metal brackets to accept connectors for conduit or armored cable (BX). Using a sturdy molded plastic frame with metal brackets or regions is a cost-effective method to manufacture these electrical boxes. This type of construction can be used with electrical boxes having conventional attachment brackets or fastening extensions as well as electrical boxes with other variations of fastening methods. The metal brackets can accommodate one or more cable connector clamps therein.

11 Claims, 7 Drawing Sheets

COMMERCIAL PLASTIC ELECTRICAL BOXES WITH METAL SECTIONS

FIELD OF THE INVENTION

The present invention relates to improvements to commercial plastic molded electrical boxes of this invention so that they can accept conduit or armored (BX) cable connectors.

BACKGROUND OF THE INVENTION

Municipal codes require that metal cable conduit or armored (BX) cable connectors be inserted into metal. However, conventional plastic multi-gang commercial line boxes do not exist. Also, metal commercial line boxes are more expensive to manufacture. Residential plastic electric boxes have more cubic inches than comparable residential metal because the metal boxes are not cost effective.

OBJECT OF THE INVENTION

It is therefore an object of the present invention to provide plastic multi-gang commercial line boxes with the ability to accept these metal cable conduit or armored (BX) cable connectors.

It is also an object to improve over the disadvantages of the prior art.

SUMMARY OF THE INVENTION

Commercial plastic molded electrical boxes of this invention have metal sections accepting conduit or armored (BX) cable connectors. A robust molded plastic frame with metal sides is more cost effective than a totally metal commercial electrical box. These are typically multi-gang boxes. Four different embodiments of these commercial multi-mount boxes are described. One uses a molded frame with a central molded plastic rib and two L-shaped metal brackets which fit into molded frame recesses on the sides and on either side of the central back plastic rib. A second embodiment uses a molded plastic box frame with an open back which accepts a U-shaped metal bracket which encloses portions of each side and the entire back of the electrical box. While any shape of metal section (such as a rectangular plate) incorporating mounting holes for conduit or armored cable connectors can be used with plastic frames, it is advantageous to use L or U-shaped metal brackets since the bend or bends afford more structural rigidity. The embodiment using a pair of L-brackets is preferred since it uses less metal than the U-shaped bracket embodiment. The third and fourth embodiments of this invention use rectangular metal strips and round metal disks respectively on the sides of a molded plastic electrical box. An optional internal bus bar with extending fingers is also compatible with these plastic/metal embodiments to comply with jurisdictional requirements or codes.

Commercial metal boxes are sometimes supplied with cable clamps which accept one or two adjacent BX or non-metallic sheathed cables. Since these cable clamps are attached via a single screw in a threaded hole adjacent the inside vertex of two orthogonal surfaces, they are compatible for use with the L-bracket and U-bracket embodiments of this invention.

BRIEF DESCRIPTION OF THE DRAWINGS

The present invention can best be understood in connection with the accompanying drawings. It is noted that the invention is not limited to the precise embodiments shown in drawings, in which:

FIG. 12 is a perspective view of a dual cable prior art clamp often supplied with metal boxes;

FIG. 13 is a perspective view of an L-bracket for a 3-gang commercial line box of this invention with knockouts and threaded hole to receive a cable clamp as shown in FIG. 12;

FIG. 14 is an internal plan view of the L-bracket of FIG. 13 with a dual clamp of FIG. 12 in the central bay location;

FIG. 15 is a perspective view of a U-bracket for a 3-gang commercial line box of this invention with knockouts and threaded holes to receive cable clamps as depicted in FIG. 12; and, FIG. 16 is an internal plan view showing two dual clamps in the central bay location of the U-bracket of FIG. 15.

DETAILED DESCRIPTION OF THE INVENTION

The actual depictions of commercial line boxes depicted in the following drawings are illustrative only. It is noted that any conventional plastic multi-gang box can accommodate similar metal brackets and/or regions shown in the following drawings. Therefore the present invention is not limited to the plastic commercial line electrical boxes shown in the drawings.

This invention relates to molded plastic commercial electrical boxes with metal brackets to accept connectors for conduit or armored cable (BX). Using a sturdy molded plastic frame with metal brackets is a cost-effective to manufacture these electrical boxes. This type of construction can be used with electrical boxes having conventional attachment brackets or fastening extensions as well as electrical boxes with other variations of fastening methods.

Figure 1:
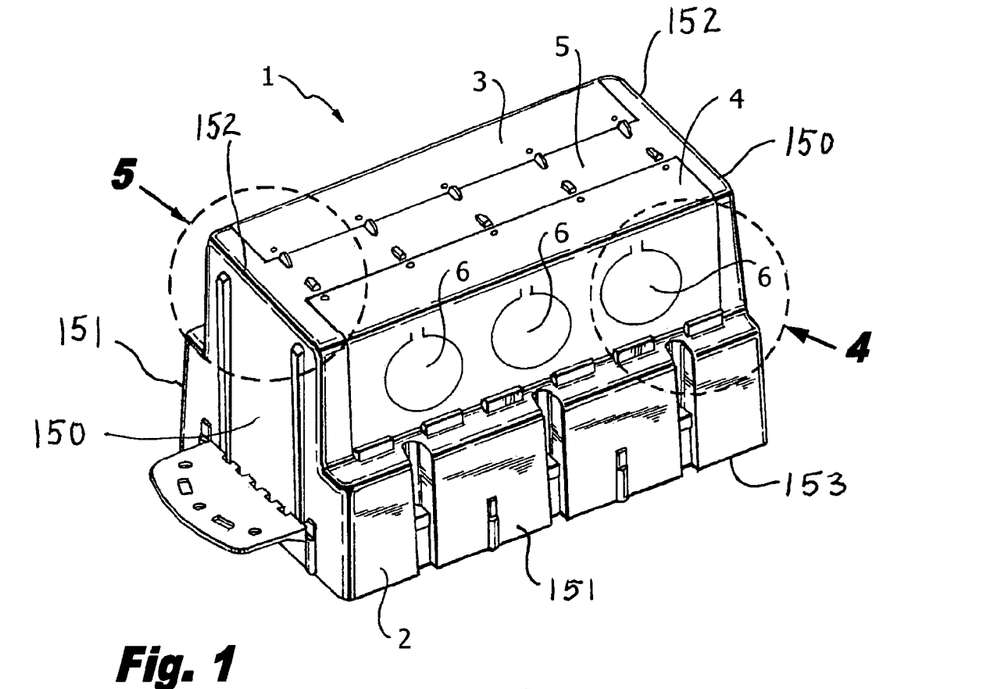
FIG. 1 is a perspective view of a commercial multi-mount electrical box with two L-shaped metal brackets.

FIG. 1 shows 3-gang box 1 using molded frame 2 with two L-shaped metal brackets 3 and 4. FIG. 1 also identifies end walls 150 extending from front edge opening 153 to rear edge 152. and side walls 151 between front edge opening 153 to midsections of end walls 150.

Although FIGS. 1-7 illustrate 3-gang boxes, any number of gangs can be implemented while not deviating from the features described. One knockout 6 for each bay on each bracket 3 and 4 is shown to accept the conduit or BX connector. Central molded back rib 5 provides a support for brackets 3 and 4.

Figure 2:
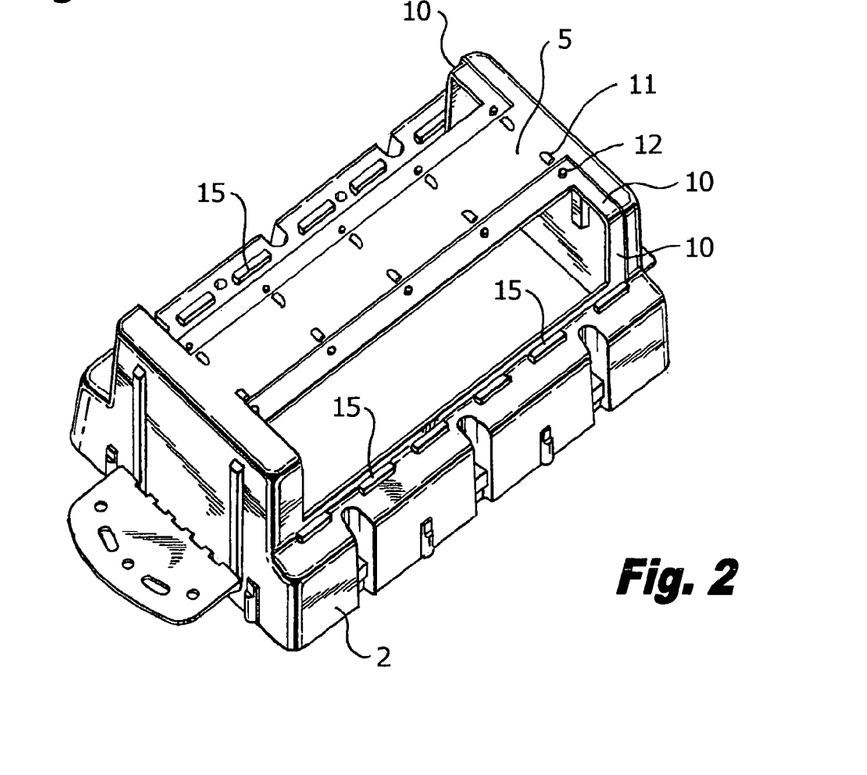
FIG. 2 is a perspective view of the molded plastic frame of the box of FIG. 1.

FIG. 2 shows the molded frame 2 before brackets 3 and 4 are installed.

Figures 3, 4, 5:
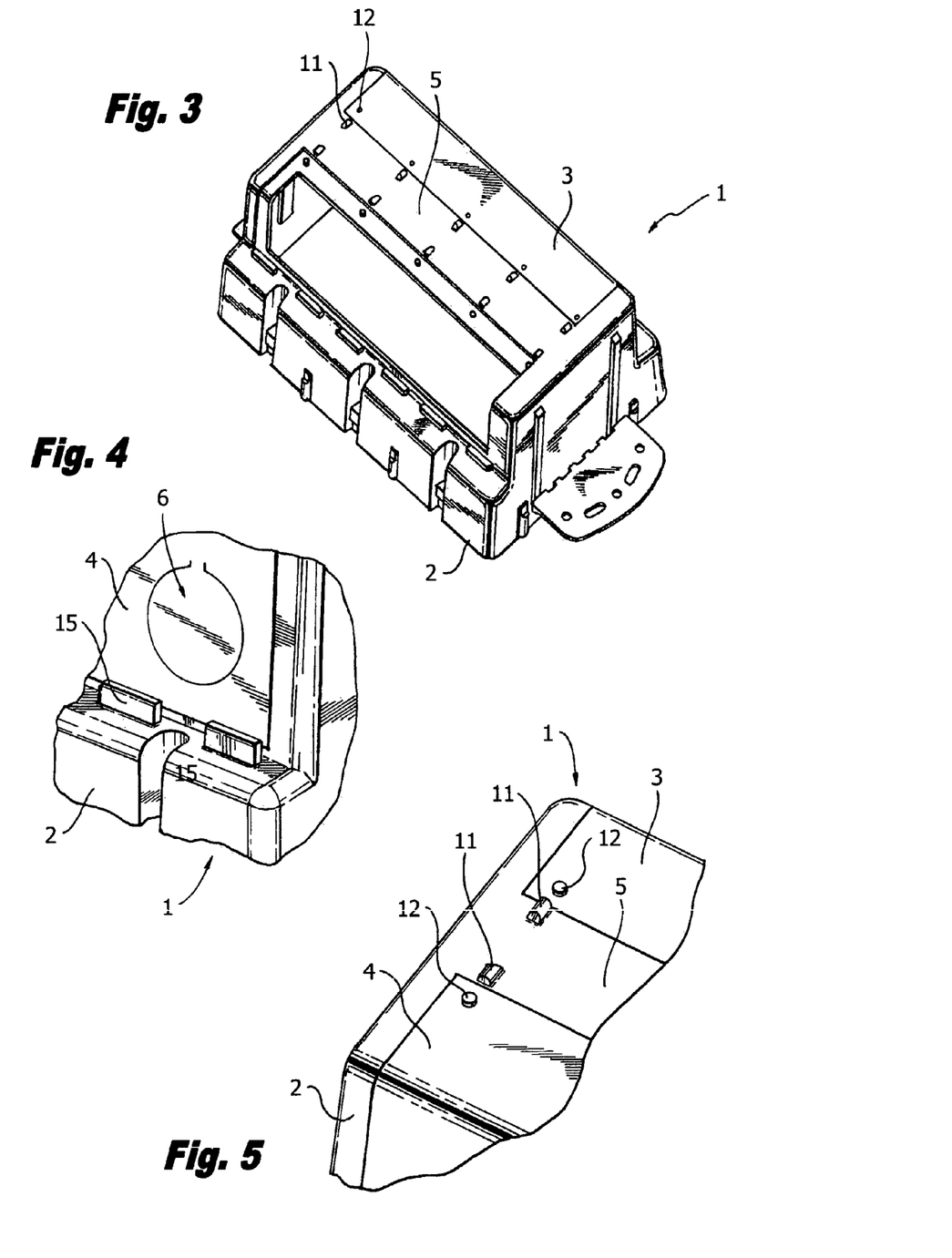
FIG. 3 is a perspective view of the box of FIG. 1 with one L-shaped metal bracket removed.
FIG. 4 is a perspective detail showing the molded piers engaging the bottom edge of a metal L-bracket.
FIG. 5 is a perspective detail showing the molded guide elements and molded pins emerging from holes in the top edges of both metal L-brackets.

FIG. 3 shows one of the two brackets 3 installed. Note the frame 2 features in FIG. 2; recessed molded frames 10 support the edges of brackets 3 and 4. Molded guides 11 with molded protruding pins 12 along rib 5 (see detail of FIG. 5) combine to guide brackets 3 and 4 and to lock them in place when slid down so that pins 12 are inserted through holes in brackets. Heat staking of the ends of pins 12 after insertion through brackets 3 and 4 can also be used to further insure fastening.

Molded piers 15 are used to retain brackets 3 and 4 at the opposite (bottom in views) edge (see detail of FIG. 4).

Figure 6:
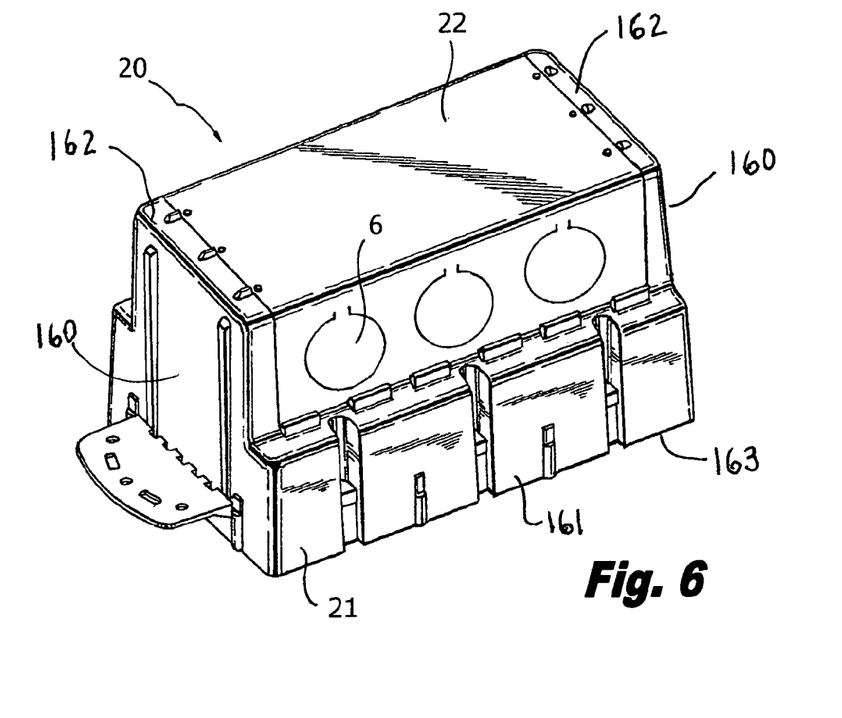
FIG. 6 is a perspective view of a commercial multi-mount box using a single U-shaped metal bracket.
Figure 7:
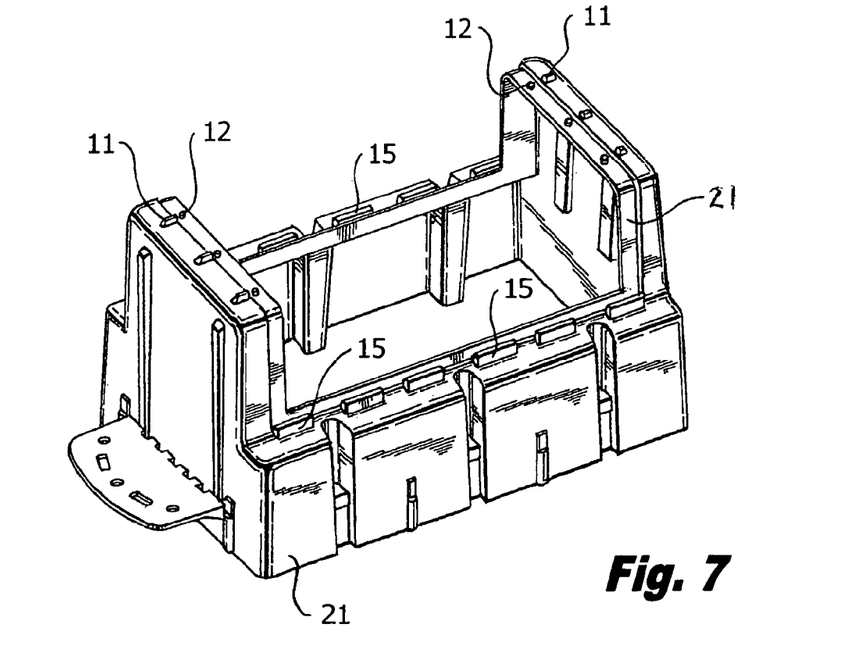
FIG. 7 is a perspective view of a molded plastic frame with no back for use with a U-shaped metal bracket.

FIGS. 6 and 7 show an alternate embodiment of commercial molded box 20 with a pair of end walls 160, having front 163 and rear 162 edges, and side walls 161 extending from front opening edge 163 to the midsections of end walls 160. This embodiment of box 20 uses a single U-shaped metal bracket 22 to enclose the side portions and entire back of molded frame 21. Molded frame recess 22 supports the end edges of U-bracket 22. As in the previous embodiment, lower (in views) edges of bracket 22 are retained by molded piers 15 and upper end edges of bracket 22 are locked in place by molded guides 11 and molded protruded pins 12 now placed along the top end (in views) edges of molded frame 21.

Figure 8:
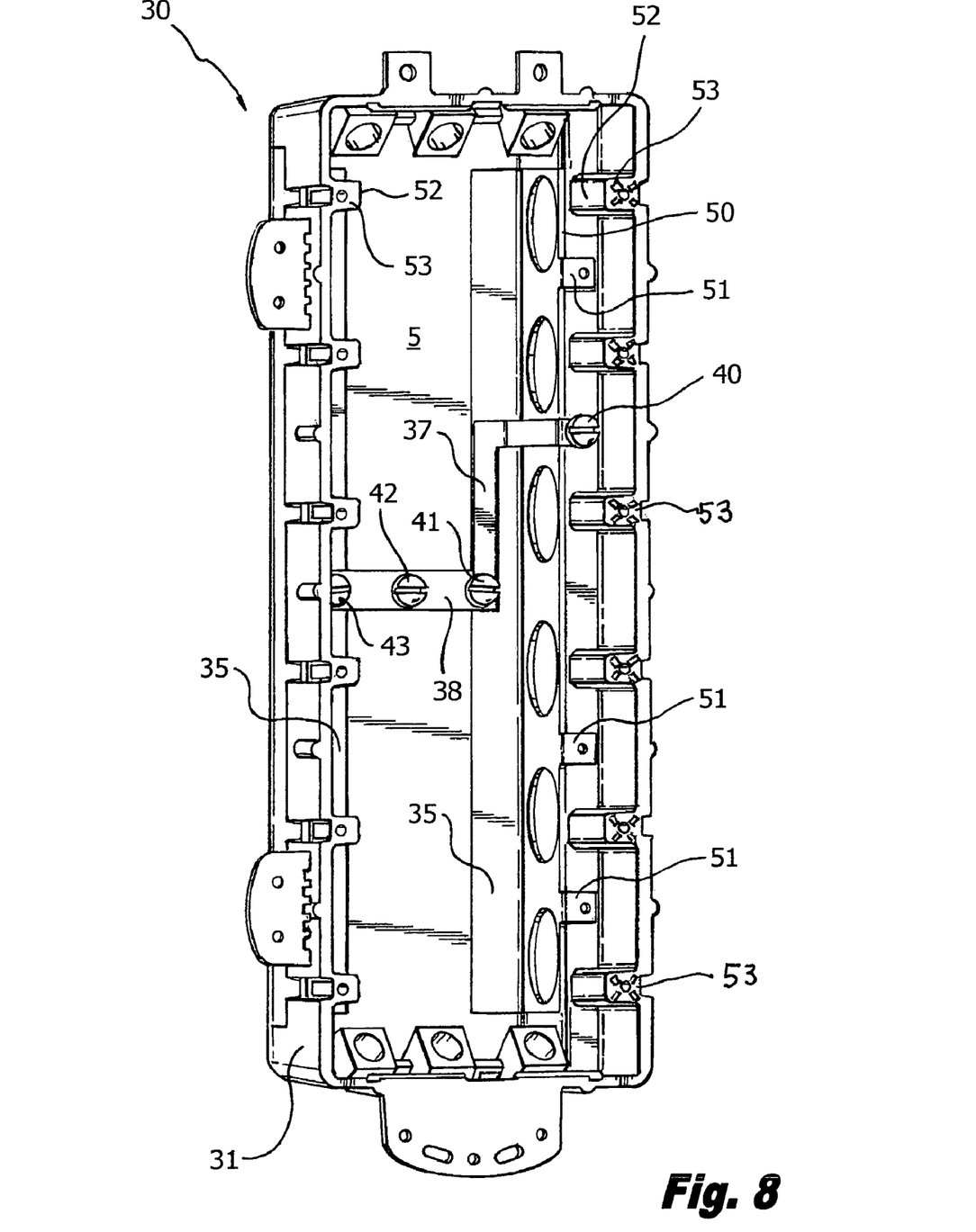
FIG. 8 is an internal perspective view of a commercial multi-mount 6-gang box using a pair of L-brackets and an internal bus bar.
Figure 9:
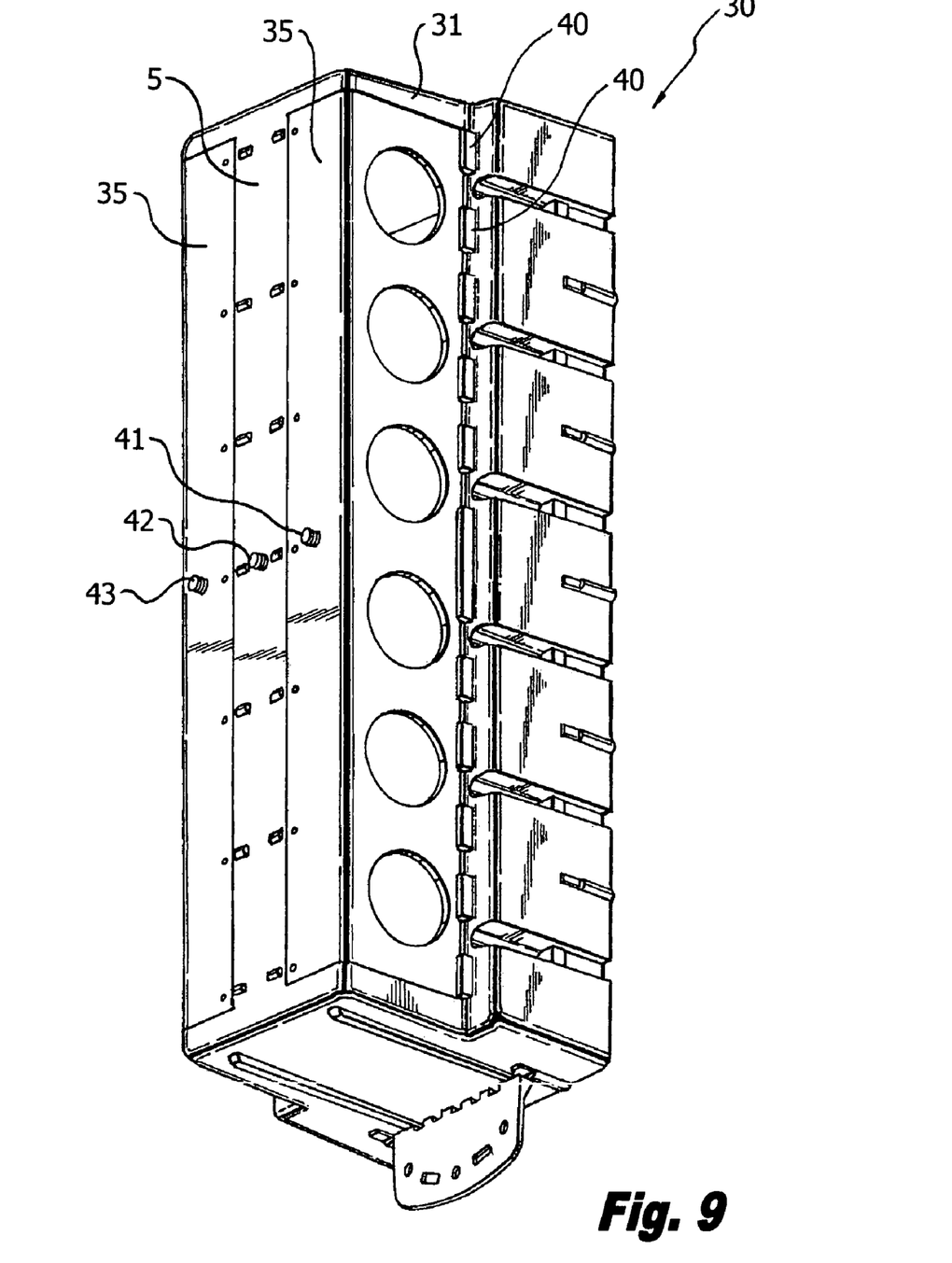
FIG. 9 is an external perspective view of the box of FIG. 8.

FIGS. 8 and 9 show two views of a 6-gang molded commercial box 30 with internal bus bar features. A horizontal bus bar 50 extends across all bays and is integral with finger extensions 52 and attachment pads 51. Note that in addition to the finger extensions 52 and contact pads 53, a conductive extension 37 is fastened via fastener 40 over a tab 51 whereas the distal end is attached to conductive crossmember 38 by fastener 41 which also conductively attaches to one of two L-brackets 35. The distal end of member 38 is obscured in FIG. 8, but it extends over a portion of the other L-bracket 35 and is fastened to it via fastener 43 (which end is shown in FIG. 9). Fastener 42 attaches to central rib 5 for rigidity. In this manner, both L-brackets as well as the mounting plate of any device (socket, switch, control, etc.) in every bay position will be insured to be at the same electrical potential.

Figure 10:
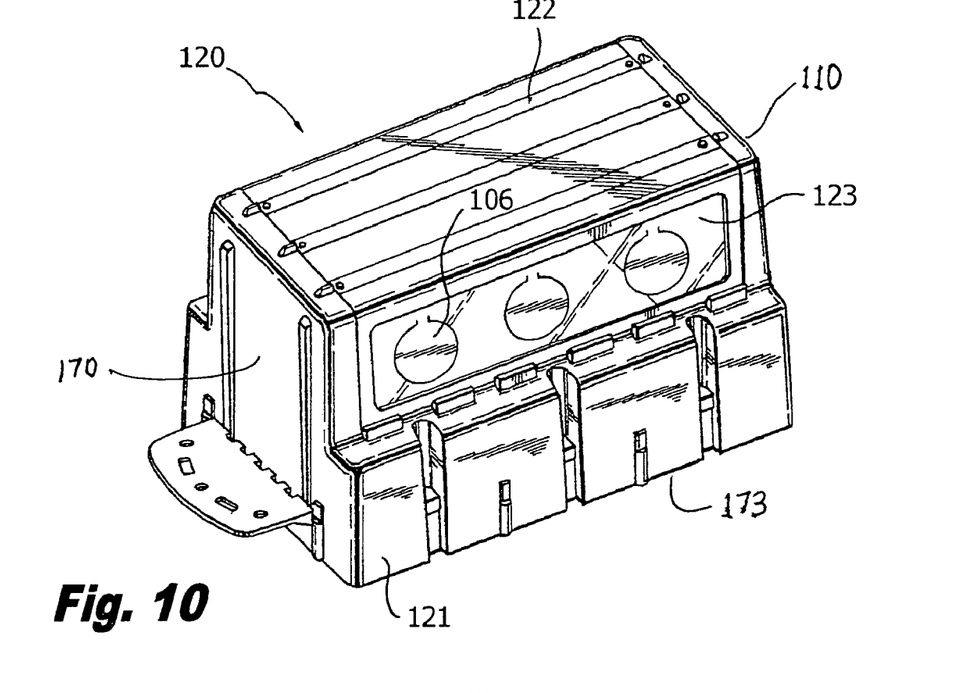
FIG. 10 is a perspective view of a third embodiment of molded plastic electrical box with metal strips attached to opposite sides.
Figure 11:
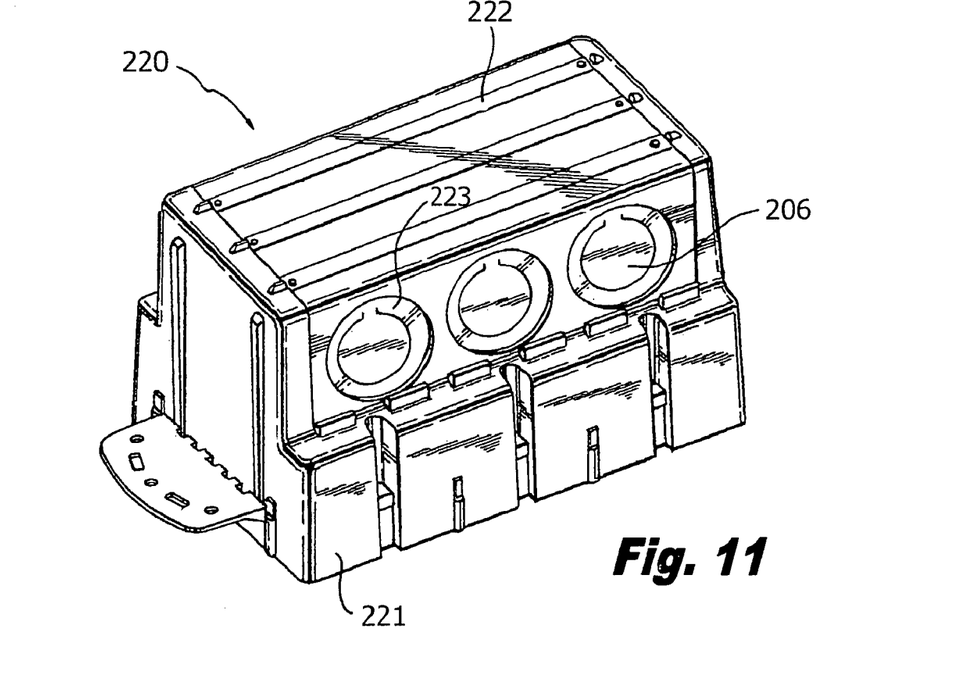
FIG. 11 is a perspective view of a fourth embodiment of molded plastic electrical box with metal disks attached to opposite sides.

Two other embodiments of this invention are shown in FIGS. 10 and 11. They both have smaller sections of metal than the first two embodiments. Box 120 shown in FIG. 10 is molded as a five sided box with front portion 121 surrounding the open front and fully enclosed back 122. FIG. 10 also shows front opening edge 173 and end walls 170. Metal strips 123 are attached to rear sides as shown, with knockouts 106 at every bay location. Metal strips 123 can be effectively attached to box 120 through the use of insert molding wherein strips 123 are placed into the mold prior to the introduction of molten resin which then surrounds the edges and locks strips into place when the resin solidifies. Similarly, box 220 of FIG. 11 is a molded five sided electrical box with front portion 221 surrounding the open front and fully enclosed back 222. Box 220 uses separate metal disks 223 at each bay location (instead of strips 122 of the previous embodiment) on opposite rear sides as shown. Each disk 223 has a knockout 206 to receive a conduit or BX connector. Disks 223 can also be effectively attached to box 220 using insert molding. In lieu of insert molding the metal features of these two embodiments can be attached using conventional fasteners or molded features such as pins 12 detailed in FIG 5. While 3-gang boxes are illustrated in FIGS. 10 and 11, any desired size can be fabricated similarly.

Figures 12, 13, 14, 15, 16:
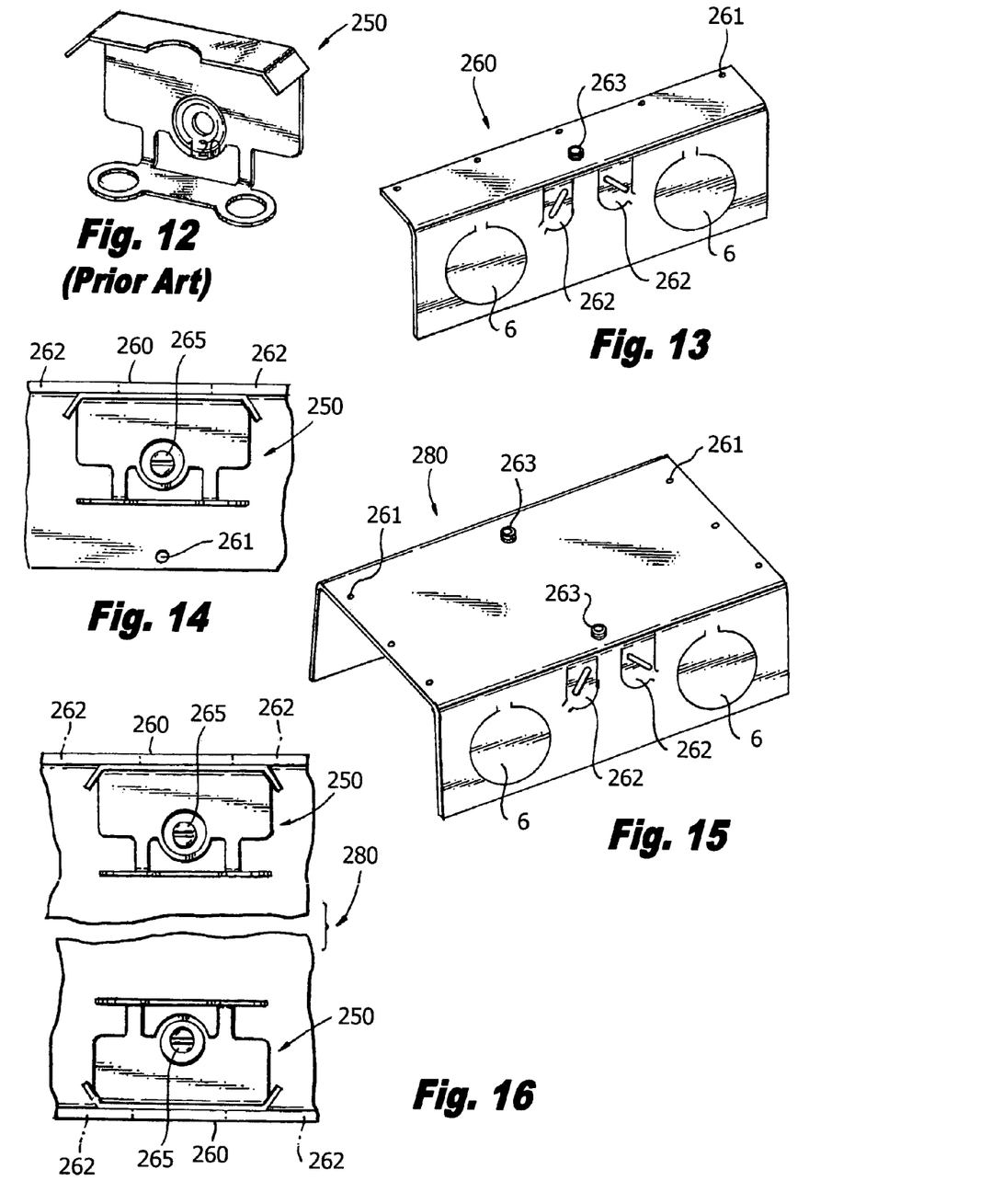

A prior art cable connector clamp for receiving one or two adjacent BX or non-metallic sheathed cables is shown in FIG. 12. This is typically a die punched and bent-up sheet metal part meant to be placed at the inside vertex of two orthogonal surfaces of a metal box; it is retained by a single machine screw in a threaded hole. This type of prior art clamp is compatible with the L-bracket and U-bracket embodiments of the commercial line box of this invention.

FIG. 13 shows L-bracket 260 with adjacent knockouts 262, with screwdriver slots to receive one or two adjacent cables. Here a 3-gang L-bracket is shown with the cable clamp to be used in the central location or bay.

Threaded hole 263 is for machine screw 265 which retains clamp 250 in the location shown in the internal view of FIG. 14. Holes 261 receive molded studs 12 as shown in FIG. 5. L-bracket 260 is meant to be used with molded frame 2, such as is typically as shown in FIG. 2. Larger boxes can have more clamps 250 configured in various bay locations.

FIG. 15 shows U-bracket 280 with knockouts 262 and threaded holes 263 to accommodate clamps 250 in central bay locations. Bracket 280 is to be used with molded frame 21 as shown in FIG. 7. U-bracket boxes with more bays can have more clamps 250 configured in various bay locations.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention, as noted in the appended Claims.

I claim:

1. A plastic electrical box with at least one integral metal section comprising:
a pair of end walls with rear and front edges; a pair of side walls extending between said end walls from the front edges of said end walls to midsections of said end walls; a flat rib joining midsections of said rear edges of said end walls leaving a pair of oppositely facing openings defined by recessed molded frames into said box; wherein said at least one metal section is a pair of L-shaped metal brackets filling said oppositely facing openings; said pair of L-shaped metal brackets having knockouts for accepting conduit or armored cable connectors into said box; and said end walls, said side walls, and said flat rib being of single piece molded plastic construction and having a forwardly facing opening, said flat rib and rear edges of said end walls have recesses to accommodate said pair of L shaped metal brackets.

2. The electrical box of claim 1 in which said flat rib has molded guides for receiving edges of legs of said pair of L shaped metal brackets forming a rear closure of said box, said flat rib having protruding pins to engage holes in said pair of L shaped brackets.

3. The electrical box of claim 2 in which rear edges of said side walls have molded piers to receive edges of legs of said pair of L shaped metal brackets enclosing sides of said electrical box.

4. The electrical box of claim 1 in which said box has multiple bays, said box having a bus bar extending across said bays.

5. The electrical box of claim 1 in which said box includes at least one cable connector clamp for receiving at least one cable; said cable connector clamp being placed at an inside vertex of two orthogonal surfaces of one of said pair of L-shaped brackets of said electrical box.

6. The electrical box of claim 1 in which one of said pair of L shaped brackets holding said cable connector clamp includes adjacent knockouts to receive at least one cable therethrough.

7. A plastic electrical box with at least one integral metal section comprising: a pair of end walls with front and rear edges; a pair of side walls extending between said end walls from the front edges of said end walls to midsections of said end walls; wherein said at least one metal section is a U-shaped metal bracket having a flat section forming a back wall of said box with a pair of oppositely facing side sections extending forwardly from said flat section with said side sections enclosing open sides of said box up to said side walls, said side sections engaging respective the rear edges of said side walls; said U-shaped metal bracket having knockouts for accepting conduit or armored cable connectors into said box; and said end walls and said side walls being of single piece molded plastic construction and having a forwardly facing opening into said box, said flat section is locked in place by molded guides and molded protruded pins along a bottom edge of said end walls over which said side sections of said flat section extend.

8. The electrical box of claim 7 in which said side sections are retained by molded piers on said side walls.

9. The electrical box of claim 7 in which said box has multiple bays, said box having a bus bar extending across said bays.

10. The electrical box of claim 7 in which said box includes at least one cable connector clamp for receiving at least one cable; said cable connector clamp being placed at an inside vertex of two orthogonal surfaces of said U-shaped bracket of said electrical box.

11. The electrical box of claim 7 wherein said at least one cable connector includes a pair of cable connectors, each of said cable connectors placed at opposite parallel walls of said U-shaped bracket.

* * * * *